(12) United States Patent
Haase et al.

(10) Patent No.: US 6,504,794 B2
(45) Date of Patent: Jan. 7, 2003

(54) TRACKING, SAFETY AND NAVIGATION SYSTEM FOR FIREFIGHTERS

(75) Inventors: Wayne C. Haase, Sterling, MA (US); Zachary S. Haase, Sterling, MA (US); Paul M. Chizinski, New Ipswich, NH (US); Malcolm S. MacGregor, Acton, MA (US); Donald B. Bruck, Bedford, MA (US)

(73) Assignee: Summit Industries, Inc., Devens, MA (US)

( * ) Notice: Subject to any disclaimer, the term of this patent is extended or adjusted under 35 U.S.C. 154(b) by 0 days.

(21) Appl. No.: 09/814,175

(22) Filed: Mar. 21, 2001

(65) Prior Publication Data

US 2002/0021621 A1 Feb. 21, 2002

Related U.S. Application Data (60) Provisional application No. 60/191,207, filed on Mar. 22, 2000.

(51) Int. Cl.[7] ................................................. G01S 3/80
(52) U.S. Cl. ......................................................... 367/119
(58) Field of Search ................................. 367/118, 910, 367/119, 120, 121

(56) References Cited

U.S. PATENT DOCUMENTS

| | | |
|---|---|---|
| 3,587,038 A | 6/1971 | Massa, Jr. |
| 5,293,351 A | 3/1994 | Noponen ........................ 367/7 |
| 5,303,206 A | 4/1994 | Bemb et al. ................. 367/127 |

*Primary Examiner*—Daniel T. Pihulic
(74) *Attorney, Agent, or Firm*—Weingarten, Schurgin, Gagnebin & Lebovici LLP (57) ABSTRACT

An ultrasonic signal is used to link a beacon unit to a tracker unit to provide a tracking and navigation system for firefighters to use in a smoke filled environment at the scene of a fire. The beacon unit transmits an omnidirectional ultrasonic signal. The tracker unit, using a directional ultrasonic receiver provides a display or other indication of the signal strength of the received ultrasonic signal to allow the direction to the beacon unit to be determined. The ultrasonic signal provided by the beacon unit may be pulse modulated to include digitally encoded data that may be used to identify particular individuals, objects, materials, dangers, or exits. In addition, the tracker unit may be provided with a transmitter and the beacon unit provided with a receiver such that audio communication may be established therebetween.

33 Claims, 7 Drawing Sheets

TRACKING, SAFETY AND NAVIGATION SYSTEM FOR FIREFIGHTERS

CROSS REFERENCE TO RELATED APPLICATIONS

This application claims priority of Provisional Application No. 60/191,207 filed Mar. 22, 2000 and titled FIREFIGHTER TRACKER SAFETY AND NAVIGATIONAL SYSTEM.

STATEMENT REGARDING FEDERALLY SPONSORED RESEARCH OR DEVELOPMENT

BACKGROUND OF THE INVENTION

Firefighting is a dangerous and difficult job performed in a hostile and dangerous environment. During a fire the air inside a burning structure can rapidly fill with dense smoke that can reduce visibility to only a few inches. The temperature within the structure can range from 200° (F.) to 400° (F.) near the floor and often be between 1000° (F.) to 2000° (F.) near the ceiling. Flash over, which is when the entire environment within the structure may reach 1000° (F.) to 2000° (F.), can cause incineration of virtually all combustible material. A firefighter who has become separated or disabled needs to be located very quickly to prevent an injury from occurring or to rescue the firefighter after an injury has occurred. If the location of the firefighter is not known an area search must be performed. The difficulty of performing an area search is compounded by the firefighters own equipment, which typically includes a helmet, air supply, coat, trousers, boots, and gloves that are designed to protect the firefighter from the surrounding hostile environment. This equipment which may weigh in the range of 50–70 lbs, makes movement difficult and restricts visibility even more. In addition, the scattering of light due to the smoke particles can severely restrict the effectiveness of flash lights.

Passive infrared imaging systems have been used to aid in location of firefighters lost or injured within a burning structure. However, these systems which distinguish objects based on the temperature difference between the object and its environment are better equipped to locate the fire itself. In addition, the system may be unable to distinguish a body from a group of burning embers in the shape of a person. Additionally, infrared light is scattered by smoke particles resulting in an image that is attenuated and blurred. Another problem for passive infrared systems is the rapidly changing temperature within the structure. As the temperature within the structure rises the victims temperature becomes lower than the surrounding area and becomes difficult to detect as the system may be saturated by the intense heat of the fire. Finally, the firefighters protective equipment is designed to minimize heat flow from the firefighter, thus making the temperature on the surface of the equipment very close to that of the environment making a fully outfitted firefighter invisible to the system.

As noted above, Rayleigh scattering scatters a wave, such as light or sound, that is passing through a medium that includes particulate matter that has a dimension that is small when compared to the wavelength of the wave. Smoke particles will scatter light, which is known as Rayleigh scattering, reducing the effective visibility within the smoke filled environment to a few feet at best. Rayleigh scattering of a wave is inversely proportional to the fourth power of the wavelength of the wave passing through the medium. Visible light has a wavelength of approximately 400–700 nanometers(nm) and will undergo greater Rayleigh scattering than infrared light having a wavelength greater than 700 nm.

Radio frequency systems using triangulation or the global positioning system (GPS) have been proposed for locating firefighters as well. In order to design a highly directional system with sufficient accuracy to locate a person within a structure, frequencies having wavelengths on the order of one inch or less would be preferred. This translates to frequencies in the range of 10 GHz or higher. However, interference caused by the materials that are contained within the buildings and that the buildings are fabricated from will be severely reflected and attenuated by the structure rendering them unsuitable for use in locating firefighters within a burning structure.

Therefore, it would be advantageous for a tracking and navigation system to be able to operate within the hostile environment of a burning structure without being affected by the smoke, heat, and the structure itself.

BRIEF SUMMARY OF THE INVENTION

An apparatus and method is disclosed for locating individuals, such as firefighters, and navigating in a smoke filled environment using a beacon unit transmitting an omnidirectional ultrasonic signal that is received by a tracker unit. The tracker unit includes a directional ultrasonic transducer coupled to a ultrasonic receiver. The ultrasonic receiver provides an indicia of the signal strength of the received ultrasonic signal, thus indicating the approximate azimuth angle to the beacon unit from the tracker. The indicia can include visual indicia such as varying the intensity or pulse rate of a single light source, or providing a linear array of lights wherein the number of light sources illuminated is indicative of the received signal strength. Alternatively, an audio signal such as varying the pitch of an audio signal or varying a pulse rate of an audio signal may be used to indicate the received signal strength. The ultrasonic signal may be modulated to include encoded digital data that may be used to identify individuals, objects, dangerous conditions, or exits.

In another embodiment, the beacon unit and tracker unit can both include an ultrasonic transmitter and receiver coupled to an ultrasonic transducer. The beacon unit provides an omnidirectional ultrasonic signal and the tracker unit includes a directional receiver that provides an output indicia of the signal strength of the received ultrasonic signal. The tracker unit sends an interrogation pulse to the beacon unit that responds with an answer pulse. To avoid self-interference, the interrogation pulse and the answer pulse may be different frequencies, different pulse widths, or both. The tracker unit and beacon unit can be configured and arranged to determine the range between the tracker unit. In this embodiment, both the azimuth angle and the distance to the beacon unit from the tracker unit may be determined. The beacon unit can be configured and arranged to provide a modulated ultrasonic signal that can include encoded digital data that is received by the tracker unit and decoded to identify individuals, objects, dangerous situations, and exits. Additionally, voice modulation may be added to the transmitters of both the beacon unit and the tracker unit to provide voice communication therebetween.

In another embodiment, a plurality of directional ultrasonic transducers and corresponding ultrasonic receivers can be arranged in a one-dimensional linear array. The received signal strength from each receiver is analyzed and displayed on a linear array of light sources that indicate the azimuth angle between the beacon unit and the tracker unit. The plurality of directional ultrasonic transducers can also be arranged in a two-dimensional array, and the resulting received signal strengths analyzed to determine both the azimuth and the elevation between the beacon unit and the tracker unit.

Additional aspects, features and advantages of the present invention are also described in the following Detailed Description.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

An apparatus providing an ultrasonic signal capable of penetrating a smoke filled environment that can locate and track an individual or an object is disclosed. As noted above, light and infrared energy are largely scattered by smoke particles due to their small wavelengths. Smoke particles will scatter ultrasonic waves much less than light waves so that ultrasonic waves can be used to provide a reliable signal link between two or more ultrasonic transceiver units due to the much longer wavelength of the ultrasonic waves. The ultrasonic waves communicating between two or more ultrasonic transceiver units can be used to provide data to allow the estimation of the azimuth direction between the units based on the received signal strength of the ultrasonic energy.

"Ultrasonic signal" as used herein refers to sound pressure waves that have a frequency greater than 20 KHz. Preferably, the ultrasonic signals that are described in the illustrated embodiments that follow have a wavelength of less than 10 mm, which corresponds to an ultrasonic wave having a frequency of at least 34 KHz.

Figure 1:
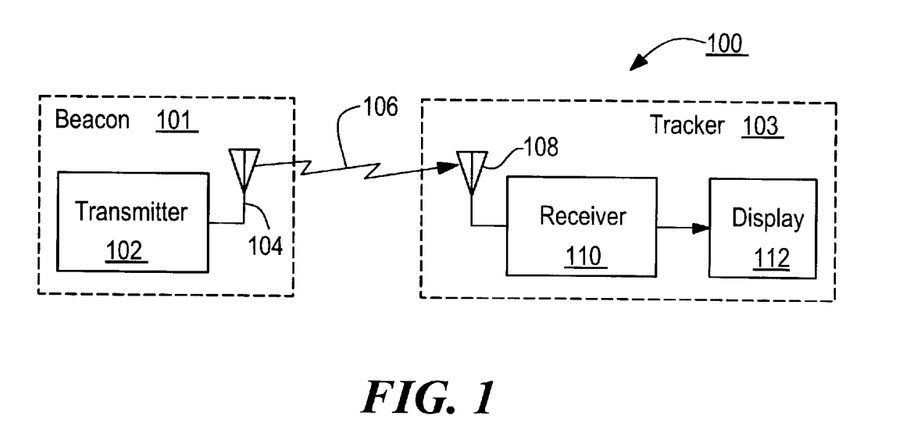
FIG. 1 is a block diagram of one embodiment of the present invention.

FIG. 1 illustrates a tracking and navigation system 100 in accordance with the present invention. The tracking and navigation system 100 includes a beacon unit 101 that is capable of transmitting an ultrasonic signal 106 to a tracker unit 103. The beacon unit 101 includes an ultrasonic transmitter 102 coupled to an ultrasonic antenna or an ultrasonic transducer 104 that provides an ultrasonic signal 106 at a beacon frequency in a substantially uniform pattern with respect to a horizontal azimuth angle. The tracker unit 103 includes a directional ultrasonic antenna or ultrasonic transducer 108 that has a predetermined beam-width that receives ultrasonic energy at the beacon frequency and is coupled to an ultrasonic receiver that provides a received ultrasonic signal strength level to an output device 112. The output device 112 provides indicia of the signal strength of the received ultrasonic energy 106. In this way, an azimuth angle to the beacon unit 101 can be estimated correlating the direction of the center of the tracker to the maximum signal strength of the received ultrasonic energy 106. The beacon transmitter 102 may be coupled to a motion sensor (not shown) that turns on the beacon if the beacon has not been moved in a predetermined period of time. This would perform sound an alarm if the firefighter is motionless for a specified period of time. Alternatively, the tracker unit may be combined with a thermal imaging camera (not shown) to provide direction information to the operator of the camera such to reduce the occurrence of false alarms such as burning embers in the shape of a person.

As used herein an ultrasonic antenna or ultrasonic transducer, whether utilized for a transmitting or receiving, can be any device that is suitable for transmitting or receiving ultrasonic energy. In the illustrated embodiments that follow, an ultrasonic transducer is described that converts electrical signals into ultrasonic signals and transmits these ultrasonic signals into space and receives ultrasonic signals and converts these received ultrasonic signals into electrical signals. Different ultrasonic transducers have different transmit/receive patterns indicative of the preferred directions, if any, in which transducer has more or less attenuation. A suitable ultrasonic transducer is manufactured by the Polaroid Corp., Cambridge Mass. The selection and configuration and arrangement of the one or more ultrasonic transducers necessary to provide the desired angular coverage for both the beacon unit 101 and the tracker unit 103 would be dependent upon the type of transducer(s) selected and the placement of the transducer(s).

The output device 112 provides a visual or audio indicia of the signal strength of the received ultrasonic signal 106. The display 112 can include a visual indication of the signal strength that may include varying the intensity of a single light source as a function of the measured signal strength, or a display in which a single light source is turned on and off at a rate that is a function of a measured signal strength. Alternatively, the signal strength may be indicated by using a plurality of light sources arranged in a linear orientation where the number of the light sources being illuminated is a function of the measured signal strength. Alternatively, the display may be an audio output in which the pitch of an audio signal is varied as a function of the measured signal strength. Alternatively, the audio signal may be pulsed on and off at a rate that is a function of the measured signal strength. Using this system, a first firefighter using a tracker unit could determine the relative direction to a second firefighter in a smoke filled environment. Through monitoring the signal strength of the received ultrasonic signal the first firefighter could locate the second firefighter. Similarly, a beacon unit placed on an exit from a room or building by firefighters as they enter the room or building to fight the fire could help a disoriented firefighter find the exit.

Figure 2:
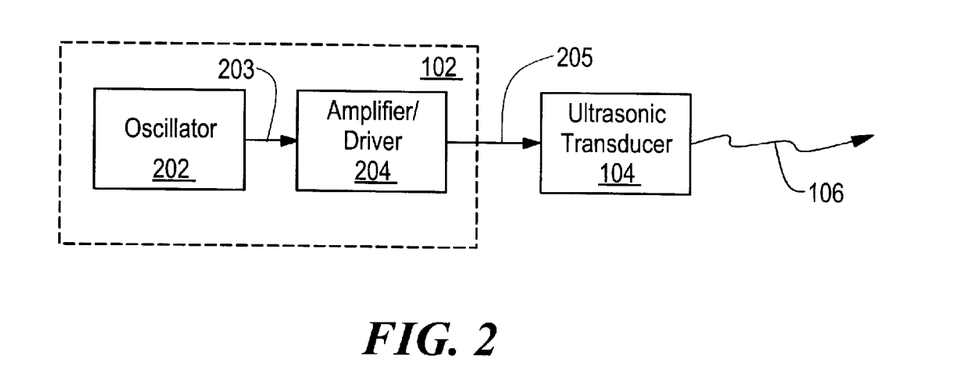
FIG. 2 is a block diagram of the transmitter 102 illustrated in FIG. 1.

FIG. 2 depicts a functional block diagram of the ultrasonic transmitter 102 and ultrasonic transducer 104 in greater detail. The ultrasonic transmitter includes an oscillator 202 that provides an output electrical signal 203 at a desired frequency. This electrical signal 203 is coupled to an amplifier/driver 204 that amplifies the electronic signal and provides a signal 205 that is suitable to drive the ultrasonic transducer 104 which transmits the ultrasonic wave. The desired frequency is the predetermined beacon frequency.

Figure 3:
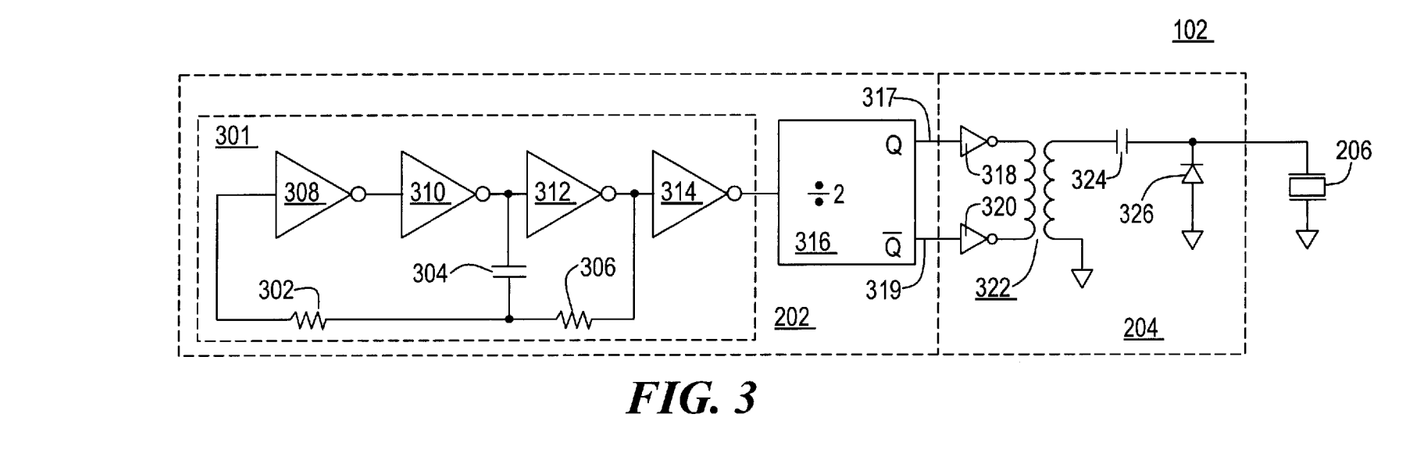
FIG. 3 is a schematic circuit diagram of the transmitter 102 illustrated in FIG. 1.

FIG. 3 depicts one embodiment of a circuit schematic suitable for use as a ultrasonic transmitter in a beacon unit. An oscillator unit 202 includes a simple RC oscillator 301 comprised of resistors 306 and 302, capacitor 314, and inverters 308, 310, 312, and 314. The simple RC oscillator 301 provides a square wave output at a frequency that is a function of resistor 306 and capacitor 314. The output of the RC oscillator 301 is divided in half by a frequency divider 316 that provides differential outputs 317 and 319. The differential outputs are provided to driver 204. The driver 204 includes inverters 318 and 320 that drive transformer 322. The signal from the secondary of transformer 322 has the DC level restored by capacitor 324 and diode 326. This DC restored signal then powers ultrasonic transducer 206. Preferably, the beacon is batter powered, light weight and portable.

In one embodiment, the inverters used are a CMOS 4049, the frequency divider is a CMOS 4013 D flop-flop configured as a frequency divider, the transformer has a turns ratio of 17/371. The values of the various resistors, capacitors, and diodes in the circuit will be dependent upon the particular beacon frequency, the type of ultrasonic transducer selected, and other system requirements that are unique to each application. It should be appreciated that other circuits could be substituted for those in the illustrated embodiment and that the illustrated embodiment is just one of many different circuits suitable for use in the present invention.

Figure 4:
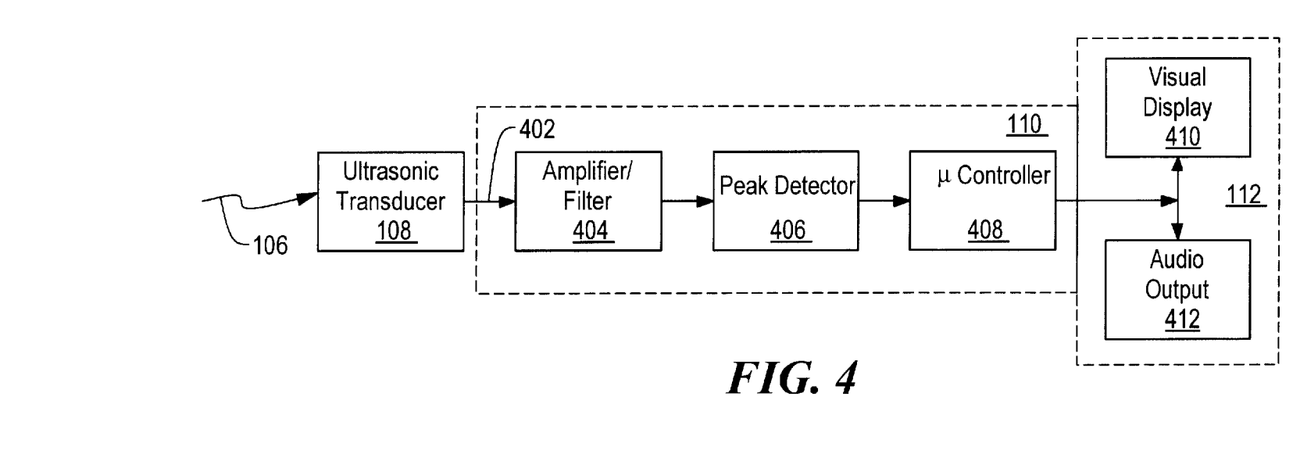
FIG. 4 is a block diagram of a receiver 110 depicted in FIG. 1.

FIG. 4 depicts a functional block diagram of an ultrasonic receiver suitable for use in a tracker module 103. Ultrasonic transducer 108 receives the ultrasonic signal 106 and converts the ultrasonic signal 106 into an electrical signal 402. The electrical signal 402 is provided to an amplifier/filter that amplifies the electrical signal 402 and filters out other extraneous signals. A peak detector 406 is used to store the peak value of the amplified and filtered signal. The peak value is then provided to a micro-controller or micro-processor 408 that digitizes the peak value and provides an appropriate output for a display device 112. The display device 112 may include a visual display or an audio output of the received signal peak level or both.

Figure 5:
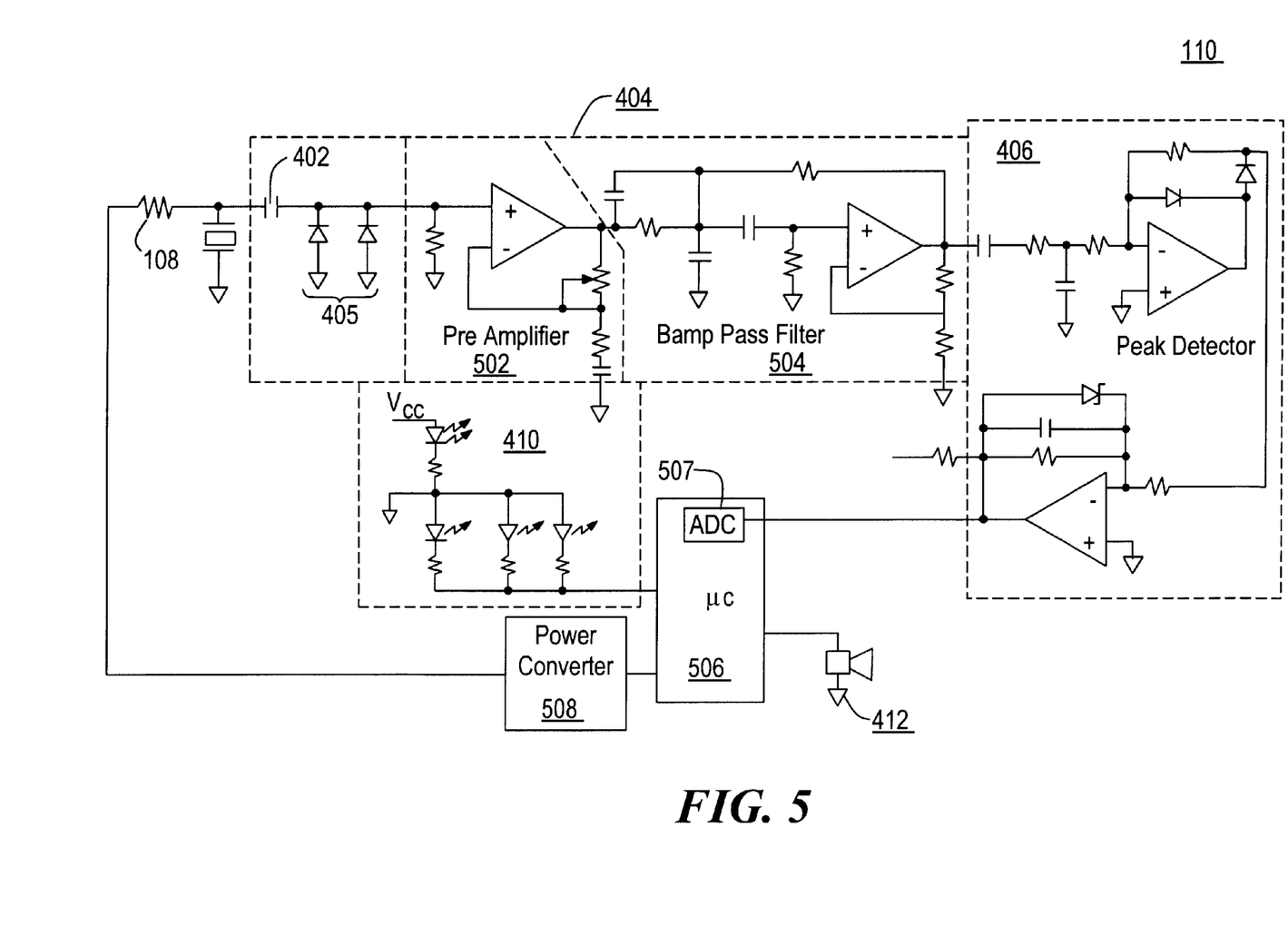
FIG. 5 is a schematic circuit diagram of the receiver 110 depicted in FIG. 4.

FIG. 5 depicts a schematic circuit diagram of an ultrasonic receiver suitable for use in a tracker module 103. Ultrasonic transducer 108 converts received ultrasonic energy into an electrical signal. This electrical signal is AC coupled via capacitor 402 and limiter circuit 403 to a preamplifier 502. The preamplifier 502 is an op-amp amplifier configured as a non-inverting amplifier. The preamplified signal is then filtered by bandpass filter 504. The peak value of the preamplified and filtered signal is determined and stored by peak detector 406. A micro-controller or micro-processor 506 that includes an analog-to-digital converter (ADC) 507 is used to provide the appropriate signals to a visual display 410 or an audio output 412. The visual display 410 can include a plurality of light emitting diodes configured and arranged such that the number of light emitting diodes illuminated is indicative of the peak value of the preamplified and bandpass filtered signal. A power converter coupled to the micro-controller or micro-processor 506 provides the necessary voltage and current to power the ultrasonic transducer. In one embodiment, the micro-controller 506 is a PIC16F876/873 and the operational amplifiers are Tl084. The TL084 is manufactured by Texas Instruments and the PIC16F876/873 is manufactured by Microchip, Inc., of Chandler, Ariz. Other op-amps having similar characteristics to the TL084 could be used as well. The values of the various resistors, capacitors, and diodes in the circuit will be dependent upon the particular beacon frequency, the type of ultrasonic transducer selected, and other system requirements that are unique to each application. It should be appreciated that other circuits could be substituted for those in the illustrated embodiment and that the illustrated embodiment is just one of many different circuits suitable for use in the present invention.

Figure 6:
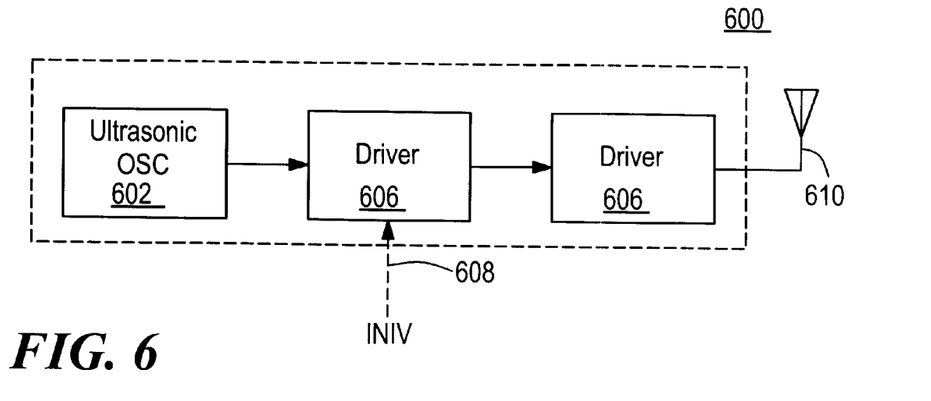
FIG. 6 is another embodiment of the present invention.

FIG. 6 depicts a functional block of another embodiment of a ultrasonic transmitter 600 suitable for use with the present invention. The transmitter 600 includes an oscillator 602 that provides electrical signals, which have a frequency equal to the beacon frequency, to a modulator 604. The modulator 604 provides a modulated signal having a signal frequency equal to the beacon frequency to the driver 606 that powers the ultrasonic transducer 610.

The modulator 604 may be a pulse modulator that provides on/off switching of the electrical signal in order to provide a pulsed ultrasonic signal from the ultrasonic transducer. In general, a pulsed signal will have a lower average power consumption than a continuous signal system. This may be important in some systems where the system is battery powered and battery life is an important consideration.

Figure 7:
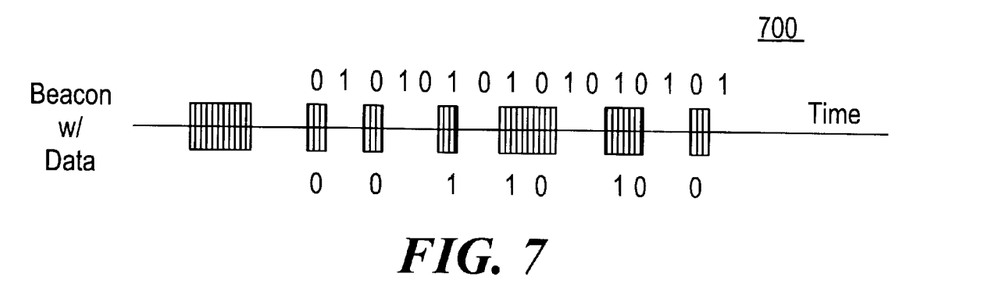
FIG. 7 is a graph of data encoded as digital data added to the ultrasonic signal by pulse modulation.

In addition to providing longer battery life, a digitally encoded data may be added to a pulse modulated ultrasonic signal. The encoded digital data can be added to the ultrasonic signal using various forms of pulse modulation. Exemplary modulation schemes that are suitable can include pulse position modulation, pulse width modulation, and pulse amplitude modulation. FIG. 7 depicts a waveform 700 using pulse position modulation to transmit an 8-bit data word. The waveform 700 includes a sync pulse 702 followed by a 8 bits of data encoded in a series of pulses using pulse position modulation. Each bit of data is encoded by the position of the pulse in either a "0" position or a "1" position. As can be seen 8 bits of data are encoded in 6 pulses where a "1" on a first bit followed by a "0" in the next subsequent bit are encoded as a single pulse. Similarly, a "0" on a first bit followed by a "1" in the next subsequent bit are encoded as a single pulse. An 8-bit data word is shown for exemplary purposes only. The data word may include more or less than 8 bits and the selection of the size of the data word is a function of the system requirements.

The encoded data added to the ultrasonic signal can be used to uniquely identify an individual, an object such as a container storing hazardous chemicals, or an exit from a building or room that the beacon is attached to, or is proximate to. If the unique identifier is to be used for identifying individuals, a list identifying the individual firefighter, for instance, and the corresponding unique identifier for that individual may be prepared and stored in a database. If the unique identifier is to be used for identifying stored materials a standard identifier may assigned to an object and the list of identifiers and the corresponding identified objects may be prepared and stored in a database. If the unique identifier is to identify exits from a building or particular rooms within the building, the location of the beacons can be ascertained earlier in time and stored in database. Alternatively, a beacon having a unique identifier may be placed by firefighters in a building identifying, for example, a particular exit. In this case the firefighters would keep track of the unique identifier assigned to a particular exit. In addition, an environmental sensor (not shown) that measures some characteristic of the environment such as air temperature, temperature rate of rise, ambient pressure, and concentrations of gasses including oxygen, carbon dioxide, and carbon monoxide, can be coupled to the pulse modulator to digitally encode the measured characteristic. Additionally, the beacon unit may include sensors to monitor the firefighters vital signs such as heart rate, blood oxygen level, and respiration rate, as well as air tank pressure. Although the illustrative embodiment is for an 8-bit data word, data words may be selected that are less-than or greater-than 8 bits.

Alternatively, a pulsed system could be used in which individual ultrasonic frequencies could be used to uniquely identify individuals, objects, or exits. In this case, the each beacon would be assigned an individual frequency that would not interfere with other beacons. The frequencies would have to be sufficiently separated to allow for the Doppler shift caused by the movement of the firefighter. As such there would be a limited number of beacons that could be used in a particular location.

Figure 8:
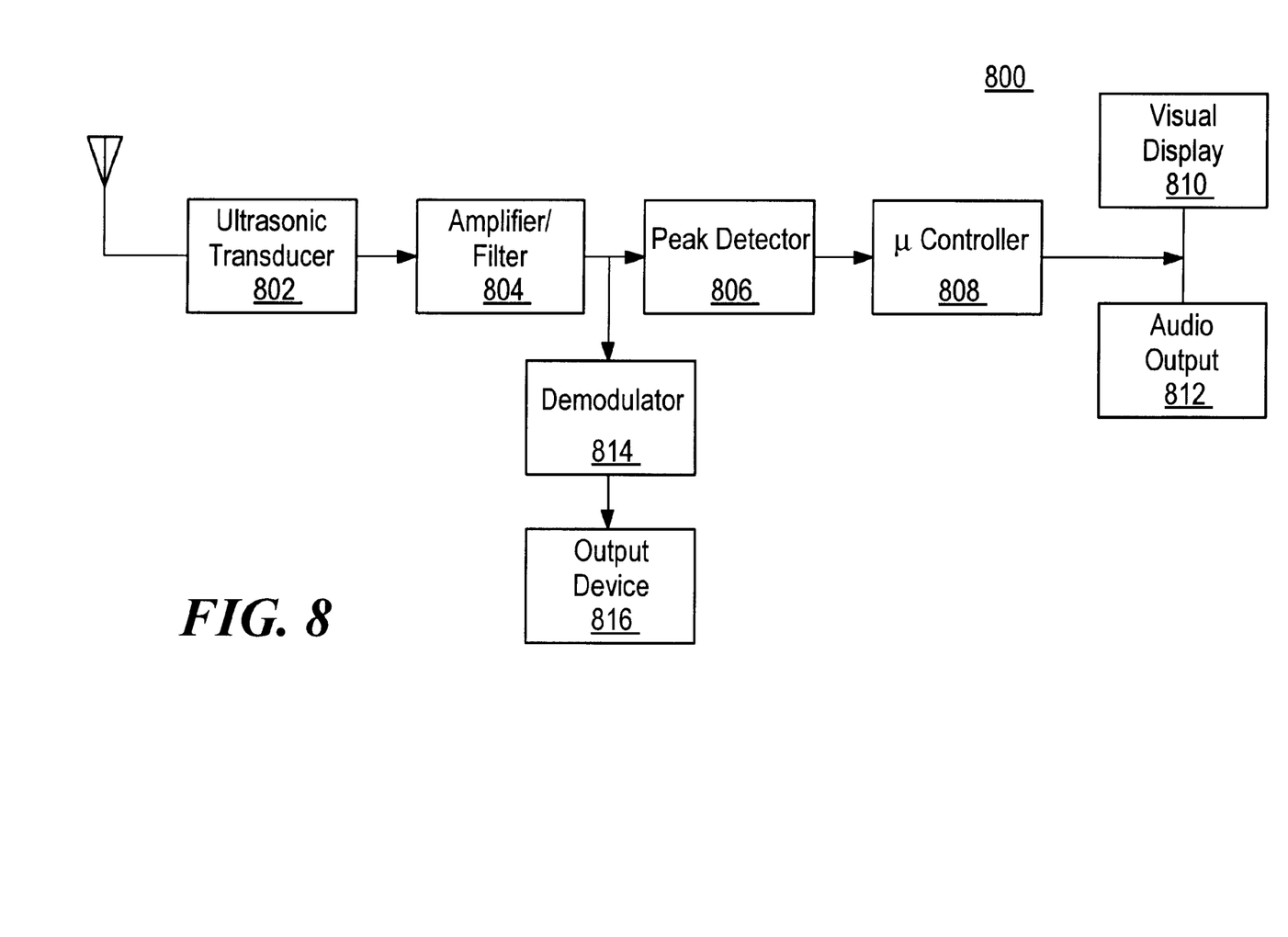
FIG. 8 is another embodiment of the receiver 608 illustrated in FIG. 6.

FIG. 8 depicts a functional block of another embodiment of a ultrasonic receiver 800 suitable for use with the transmitter depicted in FIG. 6. The receiver 800 includes the basic receiver depicted in FIG. 4 and described therewith. In the event that the transmitter ultrasonic signal is modulated as depicted in FIGS. 6 and 7, a demodulator module 814 is coupled to the amplifier/filter module 804, and an output device 816 coupled to the demodulator module 814. The demodulator 814 is configured and arranged to provide the inverse functionality of the modulator provided in FIG. 6. The output device 816 can be a display that is used to display any demodulated and decoded data that has been added to the ultrasonic signal. In addition, the demodulator can be coupled to a database (not shown) used to store the various digital codes and the corresponding data so that the information corresponding to the digitally encoded data.

The use of binary coding of information within the ultrasonic signal would allow the beacon unit to provide specific information to a firefighter. This information could include specific types of hazardous materials. The data encoded and added to the ultrasonic signal could be coordinated with standard material lists such as the four-digit coding of materials used by many fire departments. The tracker could display the particular hazardous material code or could display the corresponding material such as "high explosive", "chlorine gas", or "sodium, do not use water." If the beacon were to indicate an exit, the data may specifically include directions or information pertinent to firefighters such as "exit 10 feet left", or "stairwell." Beacons could be used to identify specific dangers as well such as pits or stairwells without doors. Beacons could be used to direct firefighters to specific rooms in a building where people are usually located, and provide data on the number of people in the particular room.

Figure 9:
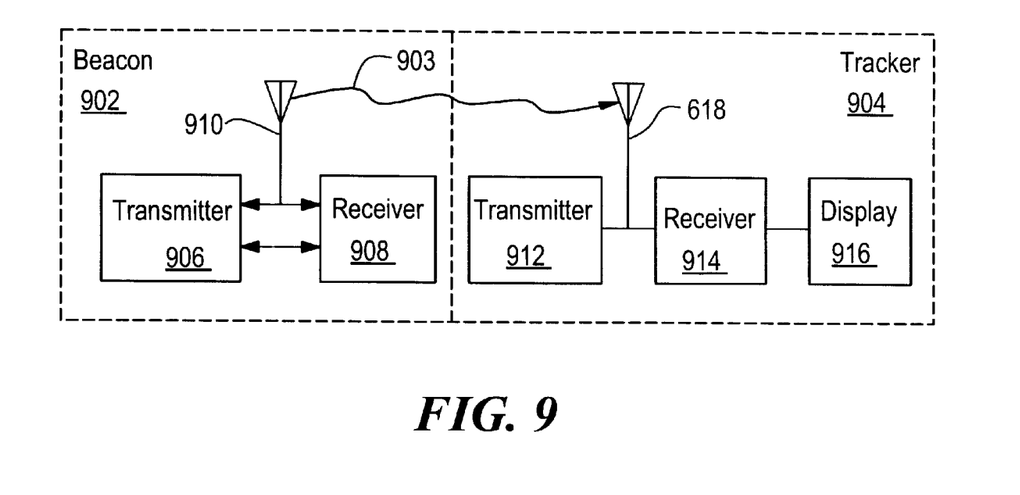
FIG. 9 is a block diagram of another embodiment of the present invention.

FIG. 9 illustrates another embodiment of a tracking and navigation system 900 in accordance with the present invention. The tracking and navigation system 900 includes a beacon unit 902 that is coupled via an ultrasonic signal 903 to a tracker unit 904. The beacon unit 902 includes a transmitter 906 and a receiver 908 coupled to a ultrasonic transducer 910. The tracker unit 904 also includes a transmitter 912 and a receiver 914 coupled to a ultrasonic transducer 918. An output device 916 is coupled to the receiver 914 to provide any necessary outputs. The output device can include visual displays or audio outputs to provide indicia of the signal strength of the received ultrasonic signal.

In this embodiment, the tracker unit 904 interrogates the beacon unit 902 with an interrogation pulse and the beacon responds with an answer pulse. To avoid self-interference the beacon unit may transmit an ultrasonic signal having a beacon frequency, and the tracker unit may transmit an ultrasonic signal having a separate tracker frequency. Alternatively, the tracker unit 904 sends an interrogation pulse having a first pulse width. Upon receiving the interrogation pulse the beacon would respond with an answer pulse having a second pulse width. The interrogation and answer pulses may, or may not, have the same frequency. So long as a specific delay and specific pulse widths are used, self interference may be avoided. In this way, the tracker would not be confused or spoofed by a reflection of its own signal.

Figure 11:
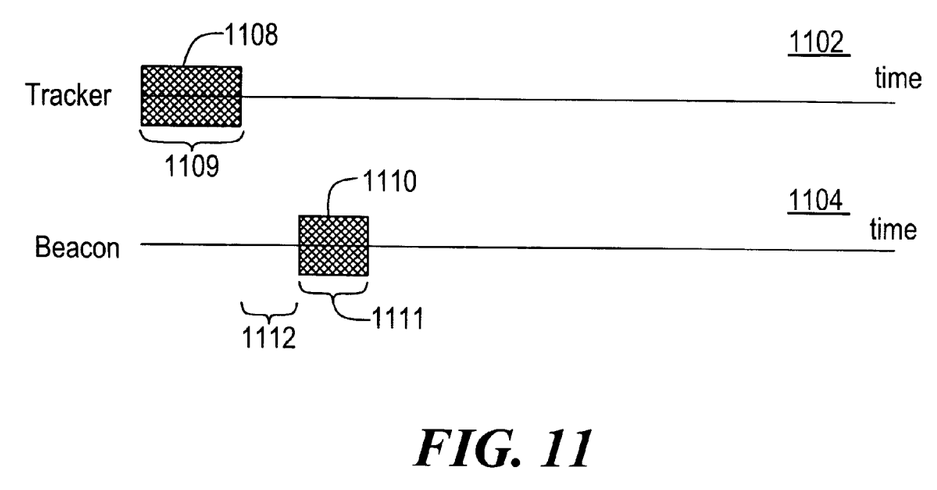
FIG. 11 is a graph illustrating an interrogation pulse and an answer pulse suitable for use in the embodiment depicted in FIG. 9.

Another advantage of the use of interrogation pulse and answer pulse is the ability to accurately determine the distance between the beacon unit and the tracker unit. By measuring the time duration from the time the interrogation pulse is transmitted to the time the answer pulse is received, the tracker unit can estimate the distance between the beacon unit 902 and the tracker unit 904. This is illustrated in FIG. 11 which depicts in graph 1102 an interrogation pulse 1108 transmitted from the tracker unit having a first pulse width 1109. The beacon unit responds after a time delay 1112, which is proportional to the distance between the tracker unit and the beacon unit, and responds with an answer pulse 1110 having a second pulse width 1111. The delay from the end of the interrogation pulse to the tracker unit receiving the answer pulse will be twice the distance between the two units. In this way, by measuring the time of arrival (TOA) of the answer pulse, the distance between the two units is ascertainable. A suitable display mounted on the tracker unit such as an LED numeric display (not shown) could be used to display the distance to the beacon.

Using this system, a first firefighter having a tracker unit and who is in communication with a second firefighter could direct a second firefighter toward themselves. The first firefighter could continuously monitor the direction and distance to the second firefighter and direct the movements of the second firefighter accordingly.

In another embodiment, the transmitter 906 of the beacon unit 902 of the tracking and navigation system 900 can contain a modulator block as depicted in FIG. 6, and the receiver 914 of the tracker 904 can contain a demodulator module and output module as depicted in FIG. 8. In this way, after receiving the interrogation pulse, the beacon unit 902 can communicate data that is digitally encoded and added to the pulse modulated beacon signal received by the tracker unit. As described above with reference to FIGS. 6 and 7 various types of data may be encoded within the beacon signal including unique identifiers for people, objects, rooms, and exits from buildings. As described above with respect to FIG. 8, the demodulator in the tracker unit would demodulate and decode the received ultrasonic signal and provide an appropriate output.

Using this embodiment, a firefighter could use the directional capability of the tracker to interrogate specific beacons to ascertain their direction and distance. Another advantage to the use of an interrogation pulse and answer pulse is the ability of the beacon unit to be maintained in a low-power listening mode. In this manner, the firefighter would turn on the beacon by interrogating the beacon when needed. Such a beacon could be powered by long life lithium batteries and would require a new battery only every 1–2 years if the power drain were sufficiently low.

In an alternative embodiment, both of the transmitters 906 and 912 contained within the beacon unit 902 and the tracker unit 904 can contain a modulation block as depicted in FIG. 6. Similarly, both of the receiver 908 and 914 contained within the beacon unit 902 and the tracker unit 904 respectively can contain a demodulation block as depicted in FIG. 8. In this embodiment, two way communication can occur between the tracker unit 904 and the beacon unit 902. If an audio input is added to the modulation block in FIG. 6 and an audio output is provided to the demodulation module in FIG. 8, voice communication between the two units can occur. Pulse modulation or other known modulation schemes suitable for modulating a carrier signal with voice data can be used. The pulse rate would need to be selected to provide sufficient sampling of the audio signal to provide a suitable audio output. An audio input/output could be microphone placed inside the helmet of the firefighter. If the distance measuring and digitally encoded capability described above was desired, a second ultrasonic signal having a second ultrasonic frequency would be utilized for this purpose.

Figure 10:
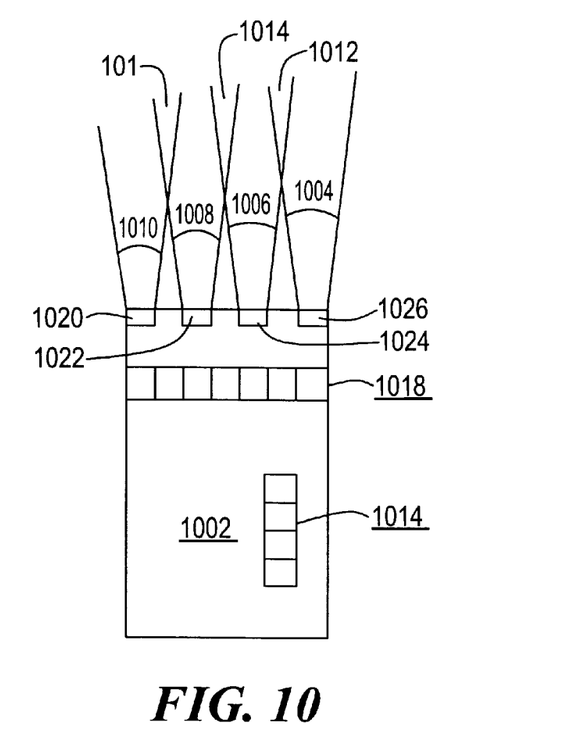
FIG. 10 depicts a block diagram of another embodiment of the present invention.

FIG. 10 illustrates another embodiment of a tracking and navigation system that allows a tracker unit to provide indicia directly of the azimuth angle to the beacon unit from the tracker. As depicted in FIG. 10, a tracker 1000 is depicted in which a plurality of ultrasonic receivers (not shown) correspond to a plurality of ultrasonic transducers 1020, 1022, 1024, and 1026. The ultrasonic transducers are configured and arranged in a one-dimensional linear array, wherein each receiver associated with each ultrasonic transducer will provide a signal strength signal of the received ultrasonic wave at each of the receivers. Each of the plurality of ultrasonic transducers has a receive signal pattern that includes a beam width corresponding thereto.

In the illustrated embodiment, ultrasonic transducer 1020 can receive ultrasonic signals within the area subtended by angle 1010. Ultrasonic transducer 1022 can receive ultrasonic signals within the area subtended by angle 1008. Ultrasonic transducer 1024 can receive ultrasonic signals within the area subtended by angle 1006, and ultrasonic transducer 1026 can receive ultrasonic signals within the area subtended by angle 1004. In order to avoid having null-spots in the receiver coverage the areas subtended by each of the ultrasonic transducers overlaps. In the illustrated embodiment overlap area 1012 corresponds to an overlap between ultrasonic transducers 1026 and 1024, overlap area 1014 corresponds to an overlap between ultrasonic transducers 1024 and 1022, and overlap area 1016 corresponds to an overlap between ultrasonic transducers 1022 and 1020. Processing the signal strengths provided by each of the ultrasonic receivers would allow the azimuth angle between the beacon and the tracker to be directly calculated or determined. A linear array of light emitting diodes 1018 can be configured and arranged to provide indicia of the calculated or determined azimuth angle. A second linear array of light emitting diodes 1014 can be provided to display an indicia of the signal strength of the received ultrasonic signal at the receiver most closely aligned with the azimuth angle.

Alternatively, the ultrasonic transducers can be arranged in a two-dimensional array in which each ultrasonic transducer has a receive signal pattern that subtends a solid angle, so that the two-dimensional array will provide coverage in both azimuth between the beacon and tracker and in elevation between the beacon and tracker. By processing the signal strength signals of the received signal strength from each of the ultrasonic receivers corresponding to each of the ultrasonic transducers, the tracker is able to locate a beacon unit both in terms of azimuth angle and in elevation angle. In addition, an indicia of the signal strength of the received ultrasonic signal from the ultrasonic receiver most closely aligned with the location of the beacon unit can be provided.

If an 8×8 array of ultrasonic transducers and corresponding receivers were used the display could include an array of 15×15 LED's. In this way, there would be an LED placed in between each pair of LED's corresponding to individual ultrasonic receivers. Averaging or otherwise interpolating the intensity of the adjacent LED pairs would allow a smoother image to be formed. The resolution of this embodiment could be increased so as to allow the 2-dimensional system to act as an ultrasonic imaging system for an entire room. The resolution of the system would be limited by the wavelength of the ultrasonic signals, approximately 10 mm or less, but would allow the ability to roughly image a room without degradation due to scattering of the signal due to the smoke.

In another embodiment, a directional beacon unit could contain 2 or 3 ultrasonic transmitters and ultrasonic transducers. In this embodiment, each transmitter/transducer combination would be used to provide a directional capability for the firefighters. By assigning a particular ultrasonic frequency, or digital code, or both, to a particular direction, a firefighter could use the directional beacon to determine the direction the firefighter approached the directional beacon from, as well as the direction the firefighter headed. In another embodiment, the directional beacon could store the particular unique identifier of the firefighter and the time the firefighter passed the directional beacon and direction the firefighter was going.

In another embodiment, a unit commander outside the building can be linked to any fixed beacon within the building via an external communication system such as radio link, a hard wired system, or a power-line communications system. In this way, the unit commander would be able to interrogate each of the fixed beacons and rapidly assess the temperatures within the building, any hazardous materials located within the building as well as the locations of various firefighters. Such information could be coordinated with the building blueprints to aid in the fire fighting strategy.

Those of ordinary skill in the art should further appreciate that variations to and modification of the above-described methods and apparatus for a tracking, navigation, and safety system may be made without departing from the inventive concepts disclosed herein. Accordingly, the invention should be viewed as limited solely by the scope and spirit of the appended claims.

What is claimed is:

1. An apparatus for locating people and objects in a difficult to see environment, the apparatus comprising:

a beacon including an ultrasonic transmitter coupled to an omnidirectional antenna, the ultrasonic transmitter providing an ultrasonic signal having a first frequency to the omnidirectional antenna for transmission therefrom;

a tracker including an ultrasonic receiver coupled to a directional antenna, the ultrasonic receiver capable of receiving the ultrasonic signal having a first frequency via the directional antenna, the tracker further providing an indicia of a measurement of the received signal strength of the received ultrasonic signal, wherein the indicia is selected from the group consisting of a single visual indicator in which the intensity of the single visual indicator is dependent upon the received signal strength, a single visual indicator pulsed on and off at a pulse rate in which the pulse rate of the single visual indicator is dependent upon the received signal strength, an audio signal in which the pitch changes as a function of the received signal strength and an audio signal pulsed on and off at a pulse rate in which the pulse rate is a function of the received signal strength;

wherein the approximate azimuth is provided by the direction corresponding to the maximum received signal strength and distance from the tracker to the beacon can be estimated as a function of the maximum received signal strength.

2. An apparatus for locating people and objects in a difficult to see environment, the apparatus comprising:

a beacon including an ultrasonic transmitter coupled to an omnidirectional antenna, the ultrasonic transmitter providing an ultrasonic beacon signal having a first frequency to the omnidirectional antenna for transmission therefrom;

a tracker including a plurality of ultrasonic receivers, each ultrasonic receiver coupled to a directional antenna, each of the plurality of directional antennas configured and arranged to receive an ultrasonic beacon signal from a predetermined spatial zone, wherein the plurality of predetermined spatial zones define a predetermined tracker zone in which the tracker can receive the ultrasonic beacon signal, the tracker configured and arranged to provide an indicia of a measurement of the signal strength of the received ultrasonic signal, and to provide indicia of the azimuth of the ultrasonic beacon signal corresponding to the predetermined spatial zone corresponding to the one of the plurality of ultrasonic receivers having the largest received signal strength within the predetermined tracker zone;

wherein the approximate azimuth as a function of the received signal strength and the distance from the tracker to the beacon as a function of the received signal strength can be estimated.

3. The apparatus of claim 2 wherein the predetermined tracker zone is a horizontal zone, wherein the spatial zone corresponding to each of the plurality of directional antennas subtends an angular region of azimuth.

4. The apparatus of claim 3 wherein the indicia of the location of the ultrasonic beacon signal is a visual display.

5. The apparatus of claim 4 wherein the visual display is a linear array of light sources.

6. The apparatus of claim 2 wherein the predetermined tracker zone is a region of azimuth and elevation, wherein the spatial zone corresponding to each of the plurality of directional antennas subtends an angular region of azimuth and elevation.

7. The apparatus of claim 6 wherein the indicia of the location of the ultrasonic beacon signal is a visual display.

8. The apparatus of claim 7 wherein the visual display is a two-dimensional array of light sources.

9. The apparatus of claim 1 further including a motion detector coupled to the beacon wherein the motion detector is configured and arranged to activate the beacon in the event that the beacon is motionless for a predetermined period of time.

10. The apparatus of claim 1 further including a pulse modulator coupled to the ultrasonic transmitter, wherein the pulse modulator is configured and arranged to cooperate with the ultrasonic transmitter to provide a pulsed ultrasonic signal for transmission via the omnidirectional antenna.

11. The apparatus of claim 10 wherein the pulse modulator modulates the ultrasonic signal with an encoded unique identifier.

12. The apparatus of claim 11 wherein the unique identifier identifies an individual.

13. The apparatus of claim 11 wherein the unique identifier identifies an object.

14. The apparatus of claim 11 wherein the unique identifier identifies an exit.

15. The apparatus of claim 11 wherein the unique identifier is encoded using a sequence of digital bits.

16. The apparatus of claim 15 wherein the sequence of digital bits is encoded using a pulse position modulation scheme.

17. The apparatus of claim 15 wherein the sequence of digital bits is encoded using a pulse width modulation scheme.

18. The apparatus of claim 10 further including an environmental sensor for measuring one or more environmental conditions coupled to the pulse modulator, wherein the pulse modulator provides an pulsed ultrasonic signal encoded with indicia of the measured one or more environmental conditions.

19. An apparatus for locating people and objects in a difficult to see environment, the apparatus comprising:

a beacon including an ultrasonic transmitter and ultrasonic receiver coupled to an omnidirectional antenna, the ultrasonic transmitter providing an ultrasonic beacon signal having a first beacon frequency to the omnidirectional antenna for transmission therefrom, the ultrasonic receiver capable of receiving the ultrasonic signal having a first tracker frequency via the omnidirectional antenna;

a tracker including an ultrasonic transmitter and an ultrasonic receiver coupled to a directional antenna, the ultrasonic transmitter providing an ultrasonic tracker signal at the first tracker frequency to the directional antenna for transmission therefrom, the ultrasonic receiver capable of receiving the ultrasonic signal having a first beacon frequency via the directional antenna, the tracker further providing an indicia of a measurement of the signal strength of the received ultrasonic signal;

wherein the tracker interrogates the beacon using the ultrasonic signal having the first tracker frequency, and the beacon responds with the ultrasonic signal having the first beacon frequency.

20. The apparatus of claim 19 further including a beacon pulse modulator coupled to the beacon ultrasonic transmitter, and a tracker pulse modulator coupled to the tracker ultrasonic transmitter, wherein the beacon pulse modulator cooperates with the beacon ultrasonic transmitter to provide a beacon signal having a beacon pulse width and the tracker pulse modulator cooperates with the tracker ultrasonic transmitter to provide a tracker signal having a tracker pulse width.

21. The apparatus of claim 20 further including a distance determination module coupled to the ultrasonic receiver and the pulse modulator, wherein the distance determination module determines the time of arrival of the beacon ultrasonic signal transmitted in response to the interrogation by the tracker and provides an indicia of the distance from the tracker to the beacon.

22. The apparatus of claim 20 wherein the beacon pulse modulator cooperates with the beacon ultrasonic transmitter to uniquely encode the ultrasonic beacon signal.

23. The apparatus of claim 22 wherein the encoded ultrasonic beacon signal uniquely identifies an exit.

24. The apparatus of claim 22 wherein the encoded ultrasonic beacon signal uniquely identifies a hazardous material.

25. The apparatus of claim 22 further including a plurality of beacons, each having a uniquely encoded beacon signal, wherein the plurality of uniquely encoded ultrasonic beacons are used to uniquely identifies an exit path.

26. The apparatus of claim 20 wherein the beacon pulse modulator modulates the beacon ultrasonic signal as a sequence of binary digits using pulse position modulation.

27. The apparatus of claim 20 wherein the beacon pulse modulator modulates the beacon ultrasonic signal as a sequence of binary digits using pulse width modulation.

28. The apparatus of claim 20 wherein the tracker pulse modulator modulates the tracker ultrasonic signal as a sequence of binary digits using pulse position modulation.

29. The apparatus of claim 20 wherein the tracker pulse modulator modulates the tracker ultrasonic signal as a sequence of binary digits using pulse width modulation.

30. The apparatus of claim 20 further including an environmental sensor providing a measurement of an environmental condition coupled to the beacon pulse modulator, wherein the beacon pulse modulator cooperates with the beacon ultrasonic transmitter to provide the beacon signal having a modulated sequence of binary digits indicative of the measured environmental condition.

31. An apparatus for locating people and objects in a difficult to see environment, the apparatus comprising:
a beacon including an ultrasonic transmitter and an ultrasonic receiver coupled to an omnidirectional antenna, the ultrasonic transmitter including a pulse modulator and an audio input coupled to the modulator, the ultrasonic transmitter providing a voice modulated ultrasonic beacon signal having a first beacon frequency to the omnidirectional antenna for transmission therefrom, the ultrasonic receiver including a pulse demodulator and an audio output coupled to the demodulator, the ultrasonic receiver receiving the voice modulated ultrasonic signal having a first tracker frequency via the omnidirectional antenna and demodulating the received ultrasonic signal and providing an audio output;
a tracker including an ultrasonic transmitter and an ultrasonic receiver coupled to a directional antenna, the ultrasonic transmitter including a pulse modulator and an audio input coupled to the modulator, the ultrasonic transmitter providing a voice modulated ultrasonic tracker signal having a first tracker frequency to the to the directional antenna for transmission therefrom, the ultrasonic receiver including a pulse demodulator and an audio output coupled to the demodulator, the ultrasonic receiver receiving the voice modulated ultrasonic beacon signal having a first beacon frequency via the directional antenna and demodulating the received ultrasonic signal and providing an audio output.

32. A method for a first person to track the position of a second person in a difficult-to-see environment, the method comprising the steps of:
providing the second person with an ultrasonic beacon unit providing an omnidirectional ultrasonic beacon signal;
providing the first person with an ultrasonic tracking unit capable of receiving in a predetermined directional beamwidth the ultrasonic beacon signal and providing an indicia of the signal strength of the received ultrasonic signal;
having the first person rotate through a range of azimuth angles while observing the indicia of the signal strength of the received ultrasonic signal; and
providing an indicia of a measurement of the received signal strength of the received ultrasonic signal, wherein the indicia is selected from the group consisting of a single visual indicator in which the intensity of the single visual indicator is dependent upon the received signal strength, a single visual indicator pulsed on and off at a pulse rate in which the pulse rate of the single visual indicator is dependent upon the received signal strength, an audio signal in which the pitch changes as a function of the received signal strength and an audio signal pulsed on and off at a pulse rate in which the pulse rate is a function of the received signal strength;
determining the azimuth angle as corresponding to the direction indicated by the indicia of signal strength corresponding to the maximum received signal strength.

33. A method of a first individual in communication with a second individual, over a communication link, to navigate in a difficult-to-see environment, the method comprising the steps of
providing the second person with an ultrasonic beacon unit providing an omnidirectional ultrasonic beacon signal;
providing the first person with an ultrasonic tracking unit capable of receiving in a predetermined beamwidth the ultrasonic beacon signal and providing an indicia of the signal strength of the received ultrasonic signal;
having the first person cause the tracker unit to interrogate the beacon unit with an interrogation pulse;
responding to the interrogation pulse by the beacon unit by providing an answer pulse;
measuring the time of arrival by the tracker unit of the answer pulse;
determining the distance to the beacon unit from the tracker unit as a function of the measured time of arrival;
providing indicia of the determined distance to the first person;
having the first individual rotate through a range of azimuth angles while observing the indicia of the signal strength of the received ultrasonic signal;
determining the azimuth angle to the beacon as a function of the received signal strength; and
providing directions by the first individual over the communications link to the second individual to reduce the distance to the first individual.

* * * * *